United States Patent
De Jager et al.

(10) Patent No.: US 11,440,454 B2
(45) Date of Patent: Sep. 13, 2022

(54) BODY FOR A TRUCK AND A TRUCK

(71) Applicant: G&G MINING FABRICATION PTY LTD, Hazelmere (AU)

(72) Inventors: John De Jager, Hazelmere (AU); Alex Cespedes, Hazelmere (AU); Ian Cornfoot, Hazelmere (AU)

(73) Assignee: SSAB Technology AB, Stockholm (SE)

( * ) Notice: Subject to any disclaimer, the term of this patent is extended or adjusted under 35 U.S.C. 154(b) by 122 days.

(21) Appl. No.: 17/048,756

(22) PCT Filed: Apr. 23, 2019

(86) PCT No.: PCT/AU2019/050360
§ 371 (c)(1),
(2) Date: Oct. 19, 2020

(87) PCT Pub. No.: WO2019/200441
PCT Pub. Date: Oct. 24, 2019

(65) Prior Publication Data
US 2021/0188147 A1 Jun. 24, 2021

(51) Int. Cl.
*B60P 1/28* (2006.01)
(52) U.S. Cl.
CPC ......... *B60P 1/286* (2013.01); *B60Y 2200/142* (2013.01)
(58) Field of Classification Search
CPC ..................................................... B60P 1/286
(Continued)

(56) References Cited

U.S. PATENT DOCUMENTS 3,363,933 A * 1/1968 Wilson ............... B60P 1/286
296/183.1
3,720,446 A 3/1973 Kelley
(Continued)

FOREIGN PATENT DOCUMENTS

AU 2012213921 A1 9/2013
AU 2017203089 A1 5/2018
(Continued)

OTHER PUBLICATIONS

Extended European Search Report for application No. 19788204.6-1015/3781435 PCT/AU2019050360, dated Jan. 4, 2022.
(Continued)

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

The present invention is in the form of a body (111) adapted to be fitted to a truck having at least two axles. The body is capable of tipping once fitted to the truck. The body comprises two side surfaces (13) interconnected by a longitudinal surface (21) to keep the side surfaces in spaced apart relation. The longitudinal surface and the side surface define a cavity (30) for receiving a payload. The longitudinal surface is configured such that the payload is self-centering as the body is loaded, such that in operation the distribution of load on each of the at least two axles remain substantially the same between a first payload having a first volume and a second payload having a second volume, neither payload resulting in the gross vehicle weight limit being exceeded.

26 Claims, 10 Drawing Sheets

(58) Field of Classification Search
USPC ....... 298/23 r, 23 df, 23 a, 23 d, 23 f, 23 md; 296/183.2, 184
See application file for complete search history.

(56) References Cited

U.S. PATENT DOCUMENTS

| | | | |
|---|---|---|---|
| 4,531,781 A * | 7/1985 | Hunt | B60P 1/16 267/141.1 |
| 5,887,914 A | 3/1999 | Hagenbuch | |
| 6,129,409 A * | 10/2000 | D'Amico | B60R 13/01 296/183.2 |
| 6,935,678 B1 * | 8/2005 | Laban | B62D 33/02 296/183.1 |
| 2002/0180242 A1 | 12/2002 | Fujan et al. | |
| 2004/0080206 A1 | 4/2004 | Parsons | |
| 2013/0094936 A1 | 4/2013 | Hagenbuch | |
| 2014/0333090 A1 | 11/2014 | Garcia-Huidobro Valdivieso | |
| 2017/0066318 A1 | 3/2017 | Uranaka et al. | |

FOREIGN PATENT DOCUMENTS

| | | |
|---|---|---|
| CL | 2009001757 A1 | 12/2009 |
| JP | S62-59144 A | 3/1987 |
| WO | WO-2009/046488 A1 | 4/2009 |
| WO | WO-2013/091007 A1 | 6/2013 |
| WO | WO-2014031686 A1 | 2/2014 |
| WO | WO-2015/010156 A1 | 1/2015 |

OTHER PUBLICATIONS

International Search Report and Written Opinion of the International Searching Authority, issued in PCT/AU2019/050360, dated Jul. 29, 2019; ISA/AU.

International Preliminary Report on Patentability of the International Searching Authority, issued in PCT/AU2019/050360 dated Aug. 5, 2020; ISA/CA.

Chilean Office Action dated May 4, 2022 for corresponding Chilean Application No. 2020-002707.

* cited by examiner

BODY FOR A TRUCK AND A TRUCK

TECHNICAL FIELD

The present invention generally relates to a body for a truck. In particular the present invention provides a body in the form of a tiltable tray for a dump truck, wherein the dump truck is particularly designed for use in mining operations and quarries. The present invention also generally relates to a truck having a body.

BACKGROUND ART

In most construction and mining operations, trucks having a body capable of tipping, such as a tray, are used to haul earthen materials from one location where it is excavated to another location where it is deposited. An illustration of a typical truck used in these mining operations is shown in FIG. 1.

The construction and mining projects where these trucks are used are located around the world. These different sites handle vastly different types of earthen materials with different characteristics: variability in weight, abrasiveness, lump size, stickiness and fluidness for stacking. As a result, a one size fits all approach in relation to truck trays does not produce the optimum results in truck performance or productivity.

In addition to the variability in characteristics of the earthen materials, the manner in which the tray is loaded also varies. This can also affect the performance of the truck. The truck can be loaded with earthen material by different configurations of machines, such as electric rope shovel, hydraulic face shovel, hydraulic backhoe, front end rubber tyre loaders and conveyer systems. Due to the different action of the loading machine, each loading machine will, when discharging the earthen material into the tray, cause different forces and impacts to be applied at different locations of the tray. These factors must be taken into account when considering tray design in order to achieve the desired truck performance and productivity.

As the tray is exposed to significant impact forces when the truck is being loaded, as well as high levels of wear as a result of the earthen material being discharged therefrom, the tray often requires repair, and eventually replacement.

Traditionally trays are constructed using flat panels reinforced by bolsters to prevent bending or buckling. These designs often use flat floors, flat sides, flat front panels and flat canopy (to protect the operators cab). These trays may be transported as flat packs and assembled and welded at site. These types of trays are very heavy and the sizes available is very limited.

With the view of extending the service life of a tray, some operators add wear plates to the trays to protect the inside areas of these trays from wear and impact damage. In most cases, this increases the tray weight by 25% to 35% of its original weight. The increase in weight of the truck decreases the amount of material which may be carried, increases the fuel consumed, and increases the wear on other components, such as the tyres.

In addition to the wear plates other modifications/additions may also be added to the tray. These modifications/additions, such as head board extensions on the front of the canopy, impact plates on the rear section on top of the canopy, tail extension to the rear floor (to reduce rock spillage), add another 5% to 8% of the tray's original weight.

In recent years competition in the mining industry has stepped up substantially, forcing mining companies to find ways of reducing their operating cost in order to remain competitive. Truck manufacturers have improved truck efficiency and now offer a range of different size trucks to suit varying mine operations. However, the design of the tray on the truck, and the effect the tray has on truck performance has largely been overlooked.

A truck manufacturer establishes the gross vehicle weight limit (GVW) of the truck, based mostly on tyre size. The GVW provides the total empty vehicle weight plus the allowable payload. Any additional item fixed to the truck, such as wear liners, reduce the allowable payload by the same amount. Conversely, anything removed from the truck increases the payload by the same amount, thereby improving the trucks productivity. It is highly desirable to operators to reduce the weight of the truck in a manner which does not result in a reduction in the GVW.

As noted in FIG. 1, the tray is configured in a manner which provides a relative flat bottom surface terminating at a flat front wall at an angle of 100° to 120°. Once mounted to a truck the bottom is angled toward the cabin. The difficulty operators are faced in relation to these trays is being able to optimally position the payload. A varying characteristic of the earthen materials is its density. For instance, the density of the overburden at a mine site will be different to the density of the ore laden with the desired material. With variations in densities, comes variations in the volume of the payload the truck can carry and the position of that payload relative to the tray. With current tray designs the centre of gravity of the payload relative to the longitudinal axis of the truck will move forward or rearward depending on the density of the earthen material. As a result, the distribution of load on the tyres varies according to the change in density of the earthen material. This results in uneven wear and may even elevate wear on certain tyres.

The change in centre of gravity provides challenges to designers when optimising the characteristics of the truck to ensure maximum service life of the truck and its wearable components. Changes in the centre of gravity away from the truck's design criteria may also affect vehicle stability, particularly during high speed cornering.

Current dump trucks typically have two axles, front being the steering axle normally fitted with two tyres and the rear being the drive axle normally fitted with four tyres. In order to obtain optimum tyre wear each tyre must carry equal portions of the load. In this regard trucks are usually designed so that each tyre carries equal portions of the load. In reality the actual load distribution between front and rear axle is determined by the location of the centre of gravity of the payload when the truck is loaded. Optimum distribution for a two axle, six tyre truck would see 67% of the load on the rear axle, and 33% of the load on the front axle, thus spreading the load equally across all six tyres. To achieve this distribution the truck's tray calculated volume is designed according to the density information of the material pertinent to the site of operation. An increase in the density of the material being handled will result in a decrease in the actual payload volume in order to maintain the GVW rating. At these reduced volumes of heavier material, the centre of gravity of the loaded truck is transferred forward, causing more load to be distributed to the front axle, overloading the front axle and causing the front tyres to wear at a quicker rate.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to provide a body which ameliorates, mitigates or overcomes, at least one disadvantage of the prior art, or which will at least provide the public with a practical choice.

The present invention generally relates to a body (also referred to as a bed, tray, tipper, hopper, tub or box) for a truck. In one example the body is fitted to a rigid frame, off-highway, rear dump truck as typically used in mining open pit operations and quarries.

The present invention provides a body adapted to be fitted to a truck such that once fitted the body is capable of tipping, the body comprising;
two side surfaces interconnected by a longitudinal surface keeping the side surfaces in spaced apart relation;
the longitudinal surface and the side surface defining a cavity for receiving a payload, such as ore, the payload does not cause the gross vehicle weight limit to be exceeded;
wherein the longitudinal surface is configured such that the payload is self-centering as the body is loaded, such that in operation the load exerted on each tyre is substantially evenly distributed regardless of the volume of payload received in the cavity.

The present invention further provides a body adapted to be fitted to a truck such that once fitted the body is capable of tipping, the truck comprising at least two axles, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, whereby the variation in axle load distribution between loads of different density is less than 5% provided that the gross vehicle weight limit is not exceeded.

Preferably the variation in axle load distribution is less than 3%. Preferably the variation in axle load distribution is less than 1.5%.

The present invention further provides a body adapted to be fitted to a truck such that once fitted the body is capable of tipping, the truck comprising at least two axles, the body comprising;
two side surfaces interconnected by a longitudinal surface keeping the side surfaces in spaced apart relation;
the longitudinal surface and the side surface defining a cavity for receiving a payload, such as ore, the payload does not cause the gross vehicle weight limit to be exceeded;
wherein the longitudinal surface is configured such that the payload is self-centering as the body is loaded, such that in operation the variation in distribution of load on each axle is less than 5% to that originally designed regardless of the volume of payload received in the cavity.

Preferably the variation in distribution with that originally designed is less than 3%. Preferably the variation in distribution with that originally designed is less than 1.5%. The originally designed distribution is the optimum load distribution for the body when the truck is taken into consideration.

The present invention further provides a body adapted to be fitted to a truck such that once fitted the body is capable of tipping, the truck comprising at least two axles, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, such that in operation the distribution of load on each of the at least two axles remain substantially the same between a first payload having a first volume and a second payload having a second volume, neither payload resulting in the gross vehicle weight limit to be exceeded.

Preferably the variation in the axle load distribution of the first payload and that of the second payload is less than 5.0%. Preferably the variation in axle loading is less than 3%. Preferably the variation in axle loading is less than 1.5%.

The first payload may be the payload used to base the design/sizing of the body thereon and will determine the position of the centre of gravity of the payload. In this regard the first payload is based on the lightest/lowest density material the body is expected to carry (and therefore its maximum volume). This calculation must typically be approved by the truck manufacturer who will ensure the calculation is within 5% of their optimum axle loading split. For a two axle, six tyre truck (four tyres on the rear axle) the calculation is based on an axle loading of 33% front axle and 67% rear axle.

The second payload may have a different density to the first payload such that the first volume and second volume vary.

In this regard the second payload may be the heaviest material associated with the site of operations, or any material up to the lightest material associated with the site of operations.

Preferably the variation between the axle loading of the first payload, when the maximum payload and gross vehicle weight is achieved with the lowest density material to be transported (largest volume); and that of the axle loading of the second payload having a different density, up to when the maximum payload and gross vehicle weight limit is achieved with the highest density material to be transported (smallest volume), is less than 5%. Preferably the variation is less than 3%. Preferably the variation is less than 1.5%.

Preferably the longitudinal surface is configured such that there is minimal variation between the position of the centre of gravity of the first payload along the longitudinal axis of the body and the position of the centre of gravity of the second payload, having a different density.

In another aspect of the invention the distance between the position of the centre of gravity of the first payload and the position of the centre of gravity of the second payload may be less than 500 mm. Preferably the difference is less than 250 mm. Preferably the difference is less than 100 mm.

Preferably the longitudinal surface incorporates one or more curved sections.

The longitudinal surface may be in the form of a contoured panel formed from a plurality of plates. One or more of the plurality of plates may be curved and co-operate with adjacent plates to provide the curved sections. Preferably all plates are curved. The plates may be curved about one axis, such as their longitudinal axis. In another aspect of the invention, one or more plates may be curved relative to additional axis. In another aspect of the invention, the one or more plates may be curved such that the one or more plates take the form of a portion of a side of a cone.

A benefit of forming the body from a plurality of plates allows for replacement of plates as required. This eliminates the need for the installation of wear plates. This will reduce the maintenance cost and truck downtime for repairs while preserving the original light weight advantage throughout the body's working life.

Preferably the longitudinal surface provides a floor section and a front wall section.

A transition from the floor section to the front wall section may be through a large radius. Preferably the transition is through a one to three metre radius, depending on the size of the body.

Preferably plates providing the bottom of the front wall section are common with the plates providing the forward end of the floor section such that the transition between the floor section and the front wall section is seamless.

The front wall section may be divided into three sections across the width of the body: a right section, a middle section and a left section.

The left and right sections may be angled rearward in order to shape the front wall section to cause earthen material placed in the body to be positioned away from the front axle.

Preferably the transition of the left and right sections of the front wall section with the left side and right side of the bottom section form a conical shape which eliminates corners and assists in controlling centering of the earthen material during load placement.

This front wall section construction and shape, together with the bottom section transition arrangement, causes all earthen material being loaded into the body, to automatically stack in a conical shape against the front wall section, spilling earthen material back on the bottom section as the body is loaded.

The plates may be arranged such that adjacent plates in the longitudinal direction overlap with each other in a manner which does not inhibit the flow of earthen material during unloading. By overlapping the plates the plate joints act to further strengthen the floor section and therefore the body, reducing the number of ribs/stiffeners/bolsters required when compared to a conventional tray. The overlap joint helps to reduce the weight of the body, making the new body both lighter and strong.

Adjacent plates in the lateral extent may be placed in a side by side arrangement with no overlap therebetween.

The plates may have different thicknesses, hardness and/or wear characteristics, selected according to their position on the body. For instance, the plates at the rear of the body may have higher wear resistance characteristics as these areas are exposed to a greater amount of abrasive wear due to unloading of the earthen material.

Preferably the plates providing the floor section vary in thickness and/or hardness from the front of the floor section (closest to the front wall section) to the rear of the body, becoming thicker and/or harder at the rear of the body. By optimising the body such that thicker plates are used only in areas where they are required to be thicker, the body is lighter in weight.

Preferably the portion of the floor section which will be exposed to the impact force when loading the body with the payload is thicker than adjacent portions thereto.

In one aspect of the invention the plates are welded together. The plates may be welded together wherein the welds comprise a continuous lap weld on the exposed surface at the rear end of each plate and an interrupted lap weld on the underside at the front end of each plate. The interrupted lap weld joint may incorporate a cut-out section between each weld. The cut out may be circular in shape. This interrupted weld joint arrangement reduces torsional stress in the welds as the body moves and flex's while following the truck chassis frame rails during the truck haul cycle.

In another aspect of the invention the plates or a section of plates are bolted in position. With this arrangement any plates/section of plates can be readily replaced when required. This cuts the time for repair and returns the body to active surface sooner.

In another aspect of the invention the plates or a section of plates may be secured to each other by a combination of welding and bolting.

Each side surface may be provided by a side wall formed from one or more plates. The one or more plates may have overlapping joints to assist in strengthening the side wall.

The side wall may provide at least one side rib extending therealong. The side rib may either be integral with the side wall wherein it is formed in the sidewall, or it may be a rib separately welded to the sidewall. The side rib may extend outwardly relative to the body cavity.

The transition between the sidewall to the floor section may be provided by a curved section.

The body may incorporate one or more ribs secured to the contoured panel. The one or more ribs may be welded to the contoured panel on a surface which is outward from the body cavity. Each rib may be welded intermittently along its length. Having the rib welded intermittently provides the body with a greater degree of flexibility than if the weld extended continuously along its entire length.

One or more of the ribs may incorporate stress relief means. The stress relief means may be in the form of a plurality of cut out sections of the rib, each cut out having an opening along the edge of the rib which is welded to the contoured panel. The intermittent welding of the rib may be such that the weld is only discontinued at the point of the opening of each cut out. Each cut out may be designed to provide a degree of flexibility to the body. The narrowest dimension of the cut-out section may be across the opening thereof.

The one or more ribs may be in the form of a beam. Each beam may be in the form of a pressed C-beam (as opposed to being rolled).

Preferably the C-beam incorporates a flattened portion between its curved sections to stiffen the C-beam profile.

Each edge of each C-beam is secured to an elongate flat plate. Preferably the C-beam is welded to each elongate flat plate along both sides of where the edge engages the flat plate. This provides a more robust connection than securing the C-beam directly to the body and in particular the floor section.

One or both edges of each flat plate comprises a plurality of cut-out sections which may be circular in shape. The flat plates may first be welded to the contoured panel along each edge between the cut-out sections before each longitudinal edge of the beam is secured to a respective elongate flat plate. The cut-outs and intermittent welding eliminates the high stress experienced at the joint when the body is twisting and flexing as otherwise experienced by a continuous weld.

Securing the C-beam in this manner isolates the beam from direct contact to the longitudinal surface and allows the flat plates to accommodate and distribute the flex in the body, as noted above.

The C-beams may be of different thicknesses dictated by the application of the body, such as experiencing heavy impact type loading or light duty impact.

The longitudinal surface provided by the floor section is exposed to the majority of forces exerted on the body during loading. Preferably the body flexes as forces are exerted thereon.

The side surfaces may flare outwardly from the front section of the body to the rear of the body such that the body tapers outwardly from the front of the body to a rear end. This reduces the pressure on the side walls of the body when the truck is dumping, and therefore reduces wear of the body, in particular the side walls. It also provides a better spread of the material being discharged during dumping and eliminates material choking. The reduced build-up of earthen material behind the tail of the body (called choking) when the body is fully raised allows the truck to lower the body without first having to move the truck forward to clear the unloaded material.

Preferably the body also comprises a canopy to protect the cabin during loading of the body. The canopy may be formed from a plurality of plates, one or more of which are curved. Preferably the canopy transitions into the contoured panel with curves which are reversed to the curve of the front wall section transition into the floor. Preferably the canopy surface is angled rearwardly toward a central area of the body such that a central portion of the canopy is lower than a front edge of the canopy. The sides of the canopy may be angled downwardly toward the centre of the canopy such that the central portion of the canopy is lower than the sides of the canopy. This arrangement eliminates the historically used squared joint between the canopy and front wall section. A benefit of such an arrangement is that it improves loading clearance for loading machine buckets and improves safety by directing stray falling rocks back into the body.

The present invention further provides a dump truck having a body fitted thereto, the body being capable of tipping relative to the truck, the body comprising;
two side surfaces interconnected by a longitudinal surface keeping the side surfaces in spaced apart relation;
the longitudinal surface and the side surface defining a cavity for receiving a payload, such as ore, the payload not causing the gross vehicle weight limit of the truck to be exceeded;
wherein the longitudinal surface is configured such that the payload is self-centering as the body is loaded, such that once loaded, the load exerted on each axle is substantially independent of the volume of payload received in the cavity such that the load is substantially evenly distributed across the tyres.

Preferably for a truck having two front tyres and four rear tyres, the optimum load distribution is 33% of the weight on the front axle and 67% of the weight on the rear axle. This distribution results in equal loading across all six tyres.

The present invention further provides a dump truck having a body fitted thereto, the body being capable of tipping relative to the truck, the truck having at least two axles, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, such that in use, once the body is loaded within the gross vehicle weight limit, the load exerted on each axle does not exceed a 5% difference between the actual axle load and the optimum axle loading on each axle.

Preferably the load exerted on each axle does not exceed a 3% difference. Preferably the load exerted on each axle does not exceed a 1.5% difference.

Preferably for a truck having two front tyres and four rear tyres and which does not exceed the gross vehicle weight limit, the optimum axle load distribution is 33% of the weight on the front axle and 67% of the weight on the rear axle resulting in equal loading across all six tyres. The optimum axle load distribution may be based on a first payload representing a full load of the lightest material.

Preferably when the truck is overloaded by 10% of the gross vehicle weight limit of the truck, the payload is distributed such that the additional load is directed towards the rear tyres, but still retaining the axle load distribution within 1.5% of the optimum axle load distribution.

Preferably when the truck is overloaded by 20% of the gross vehicle weight limit of the truck the payload is distributed such that the additional load is directed towards the rear axle, but still retaining the axle load distribution within 3% of the optimum axle load distribution.

Preferably when the payload exceeds the gross vehicle weight limit whereupon the truck is overloaded, the configuration of the longitudinal surface positions the load such that the centre of gravity of the load is rearward compared to the centre of gravity of a load when the truck is not overloaded. This shifts the distribution of the load towards the rear tyres as opposed to the front tyres, as is the case with prior art truck bodies.

The present invention further provides a body for a truck, the body being capable of tipping, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, such that there is minimal variation between the position of the centre of gravity of the payload along the longitudinal axis of the body and the position of the centre of gravity of a payload having a different density.

Preferably the minimal variation between the position of the centre of gravity of the original calculated payload and that of the centre of gravity of the payload having a different density is less than 500 mm in relation to the distance between the vertical axes of the centre of gravity. Preferably the difference is less than 250 mm. Preferably the difference is less than 100 mm. In this regard the payload may comprise the heaviest material associated with the site of operations, and the payload having a different density may comprise the lightest material associated with the site of operations.

Preferably the minimal variation between the position of the centre of gravity of the original calculated payload and that of the centre of gravity of the payload having a different density results in the load variation on each tyre being no greater than 5%. Preferably the load variation of each tyre is less than 3%.

The present invention further provides a tray for a truck, the tray being capable of tipping, the tray comprising;
two side surfaces interconnected by a longitudinal surface keeping the side surfaces in spaced apart relation;
the longitudinal surface and the side surface defining a cavity for receiving a payload, such as ore;

wherein the longitudinal surface is configured to position the payload such that there is minimal difference between the centre of gravity of an empty truck and a fully loaded truck.

In contrast to the prior art, the body of the present invention is configured to position the earthen material payload such that there is minimal difference between the centre of gravity of earthen material having different densities, and thus a minimal difference in the axle loading at these densities. Regardless of the volume and density of the material loaded into the body, the material is caused to be positioned such that the position of the centre of gravity remains substantially unchanged. As a result, the force exerted on the truck by a payload of varying densities is evenly distributed, allowing for optimum weight distribution between the front and rear axle.

The present invention further provides a body for a truck, the body being capable of tipping, the body comprising;
two side surfaces interconnected by a longitudinal surface keeping the side surfaces in spaced apart relation;
the longitudinal surface and the side surface defining a cavity for receiving a payload, such as ore;
a canopy secured to a front edge of the longitudinal surface, the canopy being configured and orientated whereupon any stray payload impacting upon the canopy is directed towards the cavity of the body.

In contrast to the prior art, the canopy not only serves to protect the cabin of the truck, but is configured and orientated such that when stray payload hits the canopy the payload is urged towards the cavity of the body rather than to either rest on the canopy or fall to the ground surrounding the truck. In this regard the canopy acts to funnel the payload into the cavity. As a result, the payload is received where it is intended, and as the area around the loading zone is not littered with fallen payload, additional clearing work by a bulldozer is not required. A further benefit of such an arrangement is that it improves loading clearance for loading machine buckets.

Preferably the canopy incorporates one or more curved sections.

The canopy may be formed from a plurality of plates, one or more of which are curved.

Preferably the longitudinal surface provides a floor section and a front wall section. The canopy may be secured to an edge of the front wall section remote from the floor section.

Preferably the canopy transitions into the front wall section with curves which are reversed to the curve of the front wall section transition into the floor.

The canopy may be angled rearward in order to direct any stray earthen material which impacts thereupon toward the cavity of the body. Preferably the canopy surface is angled rearwardly toward a central area of the body such that a central portion of the canopy is lower than a front edge of the canopy.

The sides of the canopy provide a surface which may be sloped downwardly toward the centre of the canopy such that the central portion of the canopy is lower than the sides of the canopy. This arrangement eliminates the historically used squared joint between the canopy and the front wall section.

The plates may be curved about one axis, such as their longitudinal axis. In another aspect of the invention, one or more plates may be curved relative to additional axis. In another aspect of the invention, the one or more plates may be curved such that each of the one or more plates takes the form of a portion of a side of a cone.

Preferably all plates of the canopy are curved.

The transition from the canopy to the longitudinal surface may be through a large radius. Preferably the transition is through a one to three metre radius, depending on the size of the body.

The canopy may be divided into three sections across the width of the canopy: a right section, a middle section and a left section.

The present invention further provides a body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;
two side surfaces interconnected by a longitudinal surface keeping the side surfaces in spaced apart relation;
the longitudinal surface and the side surface defining a cavity for receiving a payload;
wherein the longitudinal surface is configured such that the payload is self-centering as the body is loaded, such that in operation the load distribution on the front axle and the load distribution on the rear axle remain substantially the same between a first payload having a first volume and a second payload having a second volume, neither payload resulting in the gross vehicle weight limit being exceeded.

The present invention further provides a dump truck having a body fitted thereto, the body being capable of tipping relative to the truck, the body comprising;
two side surfaces interconnected by a longitudinal surface keeping the side surfaces in spaced apart relation;
the longitudinal surface and the side surface defining a cavity for receiving a payload, such as ore, the payload not causing the gross vehicle weight limit of the truck to be exceeded;
wherein the longitudinal surface is in the form of a contoured panel formed from a plurality of plates wherein each one of the plurality of plates is curved about at least one axis, such that the payload is caused to self-center as the body is loaded, such that the load is substantially evenly distributed across the tyres regardless of the volume of payload received in the cavity.

The present invention further provides a dump truck having a body fitted thereto, the body being capable of tipping relative to the truck, the truck having a front axle supporting two tyres, and a rear axle supporting four tyres wherein the optimum load distribution is 33% on the front axle and 67% on the rear axle, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, such that in use, once the body is loaded within the gross vehicle weight limit, the load exerted on each axle does not exceed a 5% difference between the actual axle load distribution and the optimum axle load distribution on each axle.

The present invention further provides a body for a truck, the body being capable of tipping, the truck comprising a front axle supporting two tyres, and a rear axle supporting four tyres wherein the optimum load distribution is 33% on the front axle and 67% on the rear axle, the body comprising;
two side surfaces interconnected by a longitudinal surface keeping the side surfaces in spaced apart relation;

the longitudinal surface and the side surface defining a cavity for receiving a payload, such as ore;

wherein the longitudinal surface is contoured to provide a dish shaped surface such that the payload is self-centering as the body is loaded, such that there is minimal variation between the position of the centre of gravity of the payload along the longitudinal axis of the body and the position of the centre of gravity of a payload having a different density, such that the load distribution on each of the six tyres remains evenly distributed.

The present invention further provides a tray for a truck, the tray being capable of tipping, the tray comprising;

two side surfaces interconnected by a longitudinal surface keeping the side surfaces in spaced apart relation;

the longitudinal surface and the side surface defining a cavity for receiving a payload, such as ore;

wherein the longitudinal surface is in the form of a contoured panel formed from a plurality of plates wherein each one of the plurality of plates is curved about at least one axis, such that the payload is position such that there is minimal difference between the centre of gravity of an empty truck and a fully loaded truck.

The present invention further provides a body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;

two side surfaces interconnected by a longitudinal surface keeping the side surfaces in spaced apart relation;

the longitudinal surface and the side surface defining a cavity for receiving a payload, such as ore;

wherein the longitudinal surface is configured such that the payload is self-centering as the body is loaded, such that in operation the load exerted on each tyre is substantially evenly distributed regardless of the volume of payload received in the cavity provided that the gross vehicle weight limit is not exceeded.

The present invention further provides a body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;

two side surfaces interconnected by a longitudinal surface keeping the side surfaces in spaced apart relation;

the longitudinal surface and the side surface defining a cavity for receiving a payload, such as ore;

wherein the longitudinal surface is configured such that the payload is self-centering as the body is loaded, whereby the variation in axle load distribution between the optimum load distribution and the actual load distribution is less than 5%, provided that the gross vehicle weight limit is not exceeded.

The present invention further provides a body adapted to be fitted to a truck such that once fitted the body is capable of tipping, the truck comprising at least two axles, the body comprising;

two side surfaces interconnected by a longitudinal surface keeping the side surfaces in spaced apart relation, the side surfaces flare outwardly from a front section of the body to the rear of the body such that the body tapers outwardly from the front section of the body to a rear end;

the longitudinal surface and the side surface defining a cavity for receiving a payload, the longitudinal surface is in the form of a contoured panel formed from a plurality of plates such that a floor section of the longitudinal surface provides a dish shaped surface;

wherein the longitudinal surface is configured such that the payload is self-centering as the body is loaded, such that in operation the variation in distribution of load on each axle is less than 5% to that originally designed regardless of the volume of payload received in the cavity provided that the gross vehicle weight limit is not exceeded.

The present invention further provides a body for a truck, the body being capable of tipping, the body comprising;

two side surfaces interconnected by a longitudinal surface keeping the side surfaces in spaced apart relation;

the longitudinal surface and the side surface defining a cavity for receiving a payload, such as ore;

a canopy incorporating one or more curved sections secured to a front edge of the longitudinal surface, the canopy is configured, and angled rearwardly toward a central area of the body such that a central portion of the canopy is lower than a front edge of the canopy, whereupon any stray payload impacting upon the canopy is directed towards the cavity of the body.

The present invention further provides a body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;

two side surfaces interconnected by a longitudinal surface keeping the side surfaces in spaced apart relation, the side surfaces flare outwardly from the front of the body to the rear of the body such that the body tapers outwardly from the front of the body to the rear, wherein the transition between each sidewall to the longitudinal surface is provided by a curved section;

the longitudinal surface and the side surface defining a cavity for receiving a payload;

a canopy incorporating one or more curved sections secured to a front edge of the longitudinal surface, the canopy is configured, and angled rearwardly toward a central area of the body such that a central portion of the canopy is lower than a front edge of the canopy, whereupon any stray payload impacting upon the canopy is directed towards the cavity of the body;

wherein the longitudinal surface is configured such that once the body is loaded within the gross vehicle weight limit, the load exerted on each axle does not exceed a 5% difference between the actual axle load distribution and the optimum axle load distribution on each axle.

The present invention further provides a vehicle, such as a truck, having a body as herein before described fitted thereto.

The present invention further provides a dump truck having a body as herein before described fitted thereto.

BRIEF DESCRIPTION OF THE DRAWINGS

Further features of the present invention are more fully described in the following description of non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
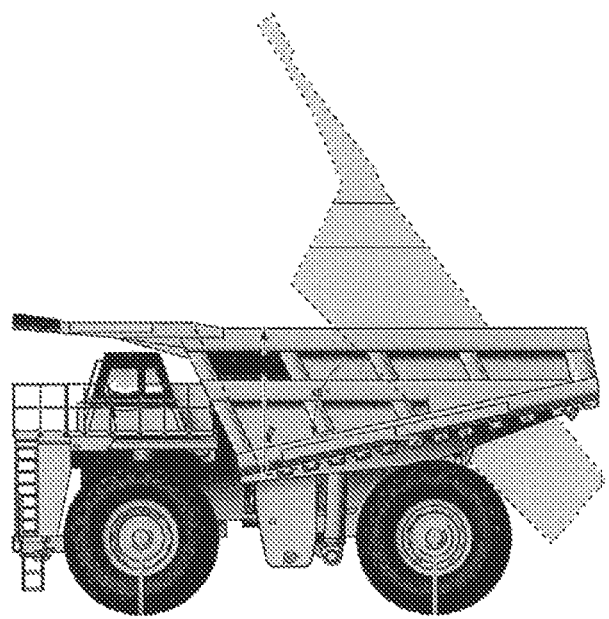
FIG. 1 is a side view of a prior art truck with a tipping tray as currently used in many mining operations.

FIGS. 2 to 20 represent two embodiments of the present invention. Each embodiment provides a body which is adapted to be fitted to a truck, such as a dump truck. Typically dump trucks have a front axle for supporting two tyres, and a rear axle for supporting four tyres. For the purpose of these embodiments the body is fitted to a dump truck of this configuration. As understood by a person skilled in the art, the truck can take different configurations. These different configurations are considered to fall within the scope of this invention.

Referring to FIGS. 2 to 6, the invention according to a first embodiment comprises a body which is in the form of a tray 11 suited for a dump/tip truck (not shown) used for mining.

The tray 11 comprises two side surfaces 13 each provided by a sidewall 15. The sidewalls 15 are in spaced apart relation whereby the tray tapers outwardly from a front end 17 of the tray to a rear end 19 of the tray.

Spanning between the two sidewalls 15 is a longitudinal surface 21 in the form of a contoured panel 22. The contoured panel 22 and the sidewalls 15 define a cavity 30 for receiving a payload, such as ore (not shown).

In the present embodiment the contoured panel 22 extends from the rear end 19 to a top end 23 of the tray. The contoured panel 22 provides a floor section 25 and a front wall section 27.

The contoured panel 22 provides a plurality of curved sections 29. The curved sections 29 prevent hang up of the payload during unloading, ensuring the payload is effectively and efficiently discharged from the tray 11 when unloading. The curved sections 29 also provide the contours of the contoured panel 22 and cause the payload to be stacked at the required position in relation to the tray 11.

Figure 2:
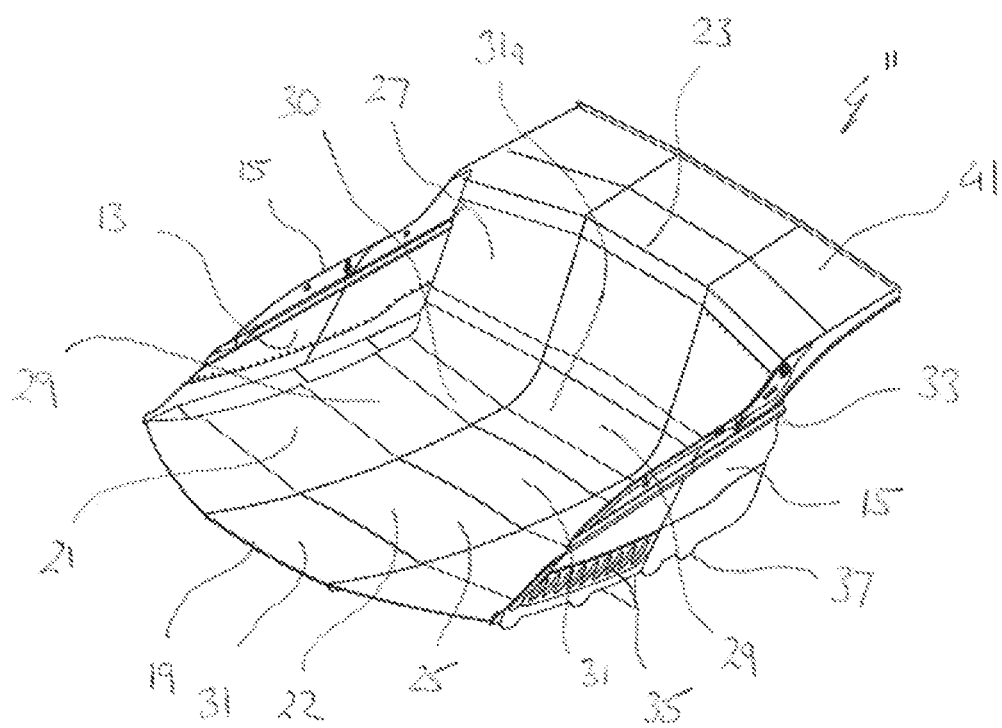
FIG. 2 is a rear perspective view of a body, in the form of a tray, for a truck, the tray being in accordance with a first embodiment of the invention.

The floor section 25 and the front wall section 27 are formed from a plurality of plates 31. Each plate is curved about a longitudinal axis thereof, wherein the radius of curvature depends on the position of the plate in the tray 11. As best shown in FIG. 2, the transition from the floor section 25 to the front wall section 27 is provided by a common set of curved plates 31a so that the joint therebetween is seamless The transition of the floor section 25 to the front wall section 27 incorporate plates 31a having the largest radius of curvature.

Adjacent plates 31 in the lateral direction of the tray 11 are placed in side by side arrangement before being welded together. Adjacent plates 31 in the longitudinal direction of the tray 11 are placed in an overlapping arrangement before being welded together. The overlapping of plates being such that the material is not inhibited from being discharged from the tray. The overlapping joint of the plates 31 adds strength to the tray and reduces the number of stiffening ribs required.

The overlapping joint of the plates are welded together whereby the edge exposed to the payload has a continuous weld therealong, while the weld along the underside of the tray is secured using an intermittent weld. The edge of the plate which sits under the adjacent plate to provide the overlap incorporates stress relief means in the form of a series of cut-outs 39, as identified in FIG. 6.

Figure 3:
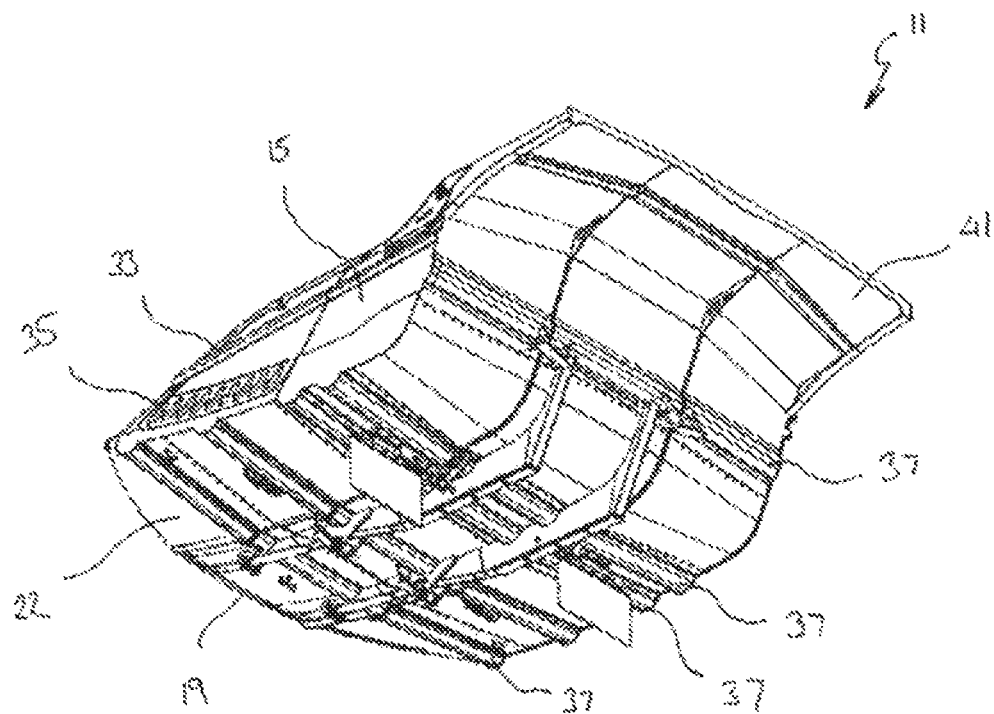
FIG. 3 is a bottom perspective view of the tray shown in FIG. 2.
Figure 4:
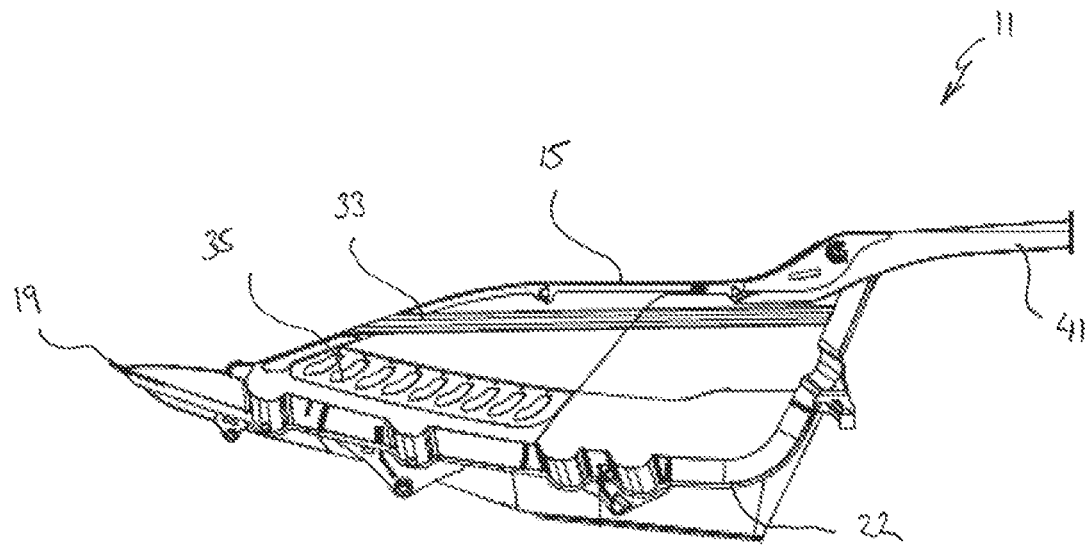
FIG. 4 is a side view of the tray shown in FIG. 2.
Figure 5:
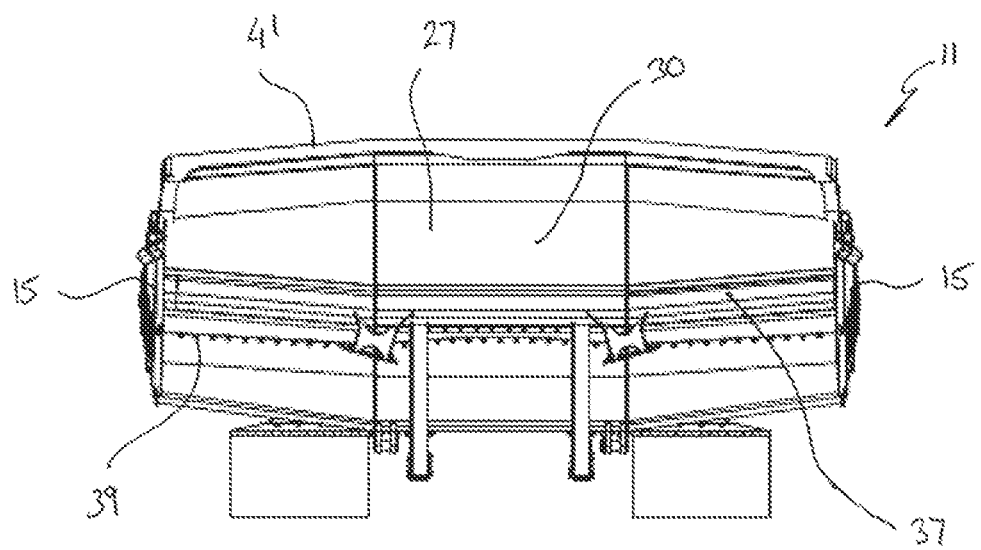
FIG. 5 is a front view of the tray shown in FIG. 2.
Figure 6:
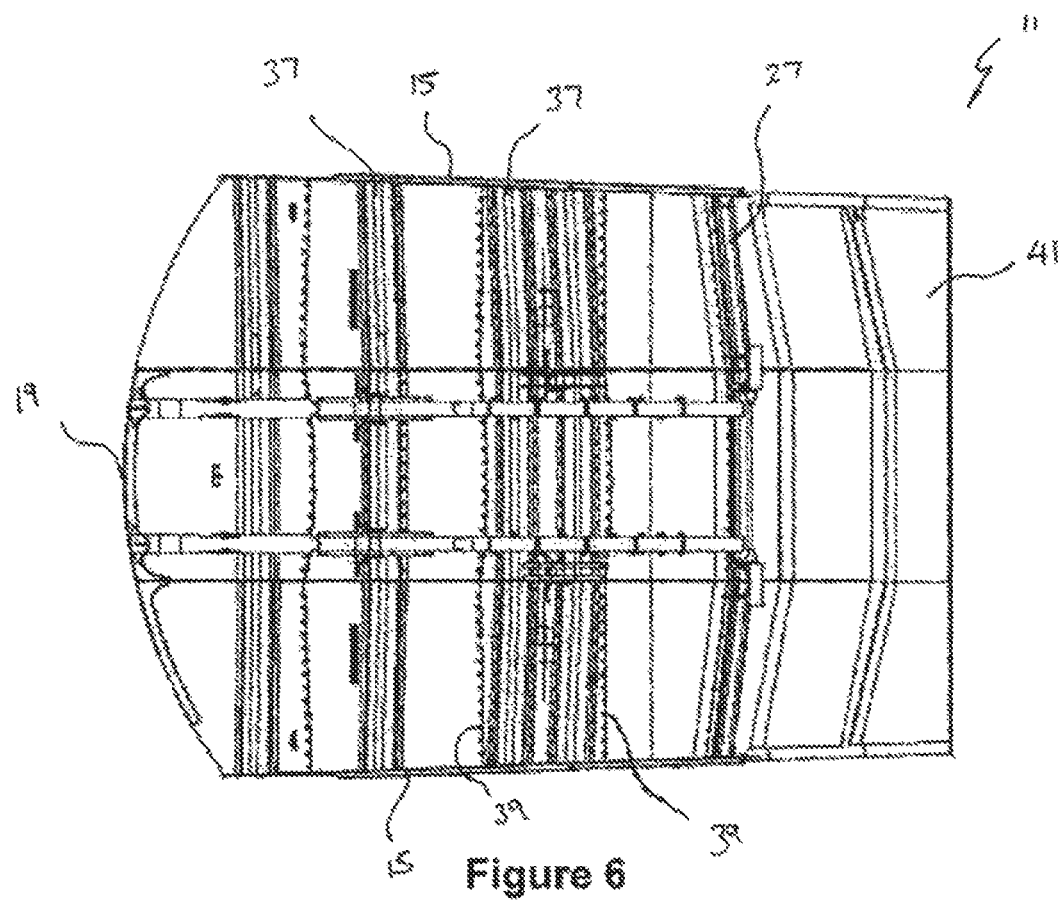
FIG. 6 is a bottom view of the tray shown in FIG. 2.
Figure 7:
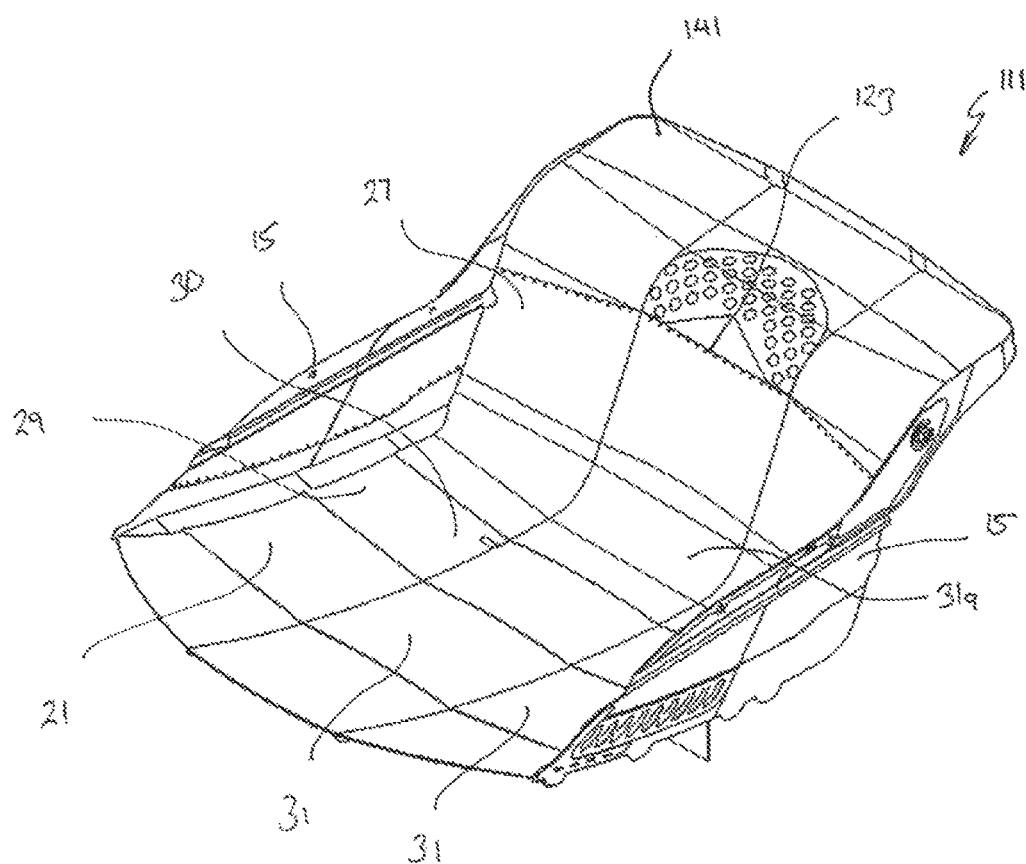
FIG. 7 is a rear perspective view of a body, in the form of a tray, for a truck, the tray being in accordance with a second embodiment of the invention.
Figure 8:
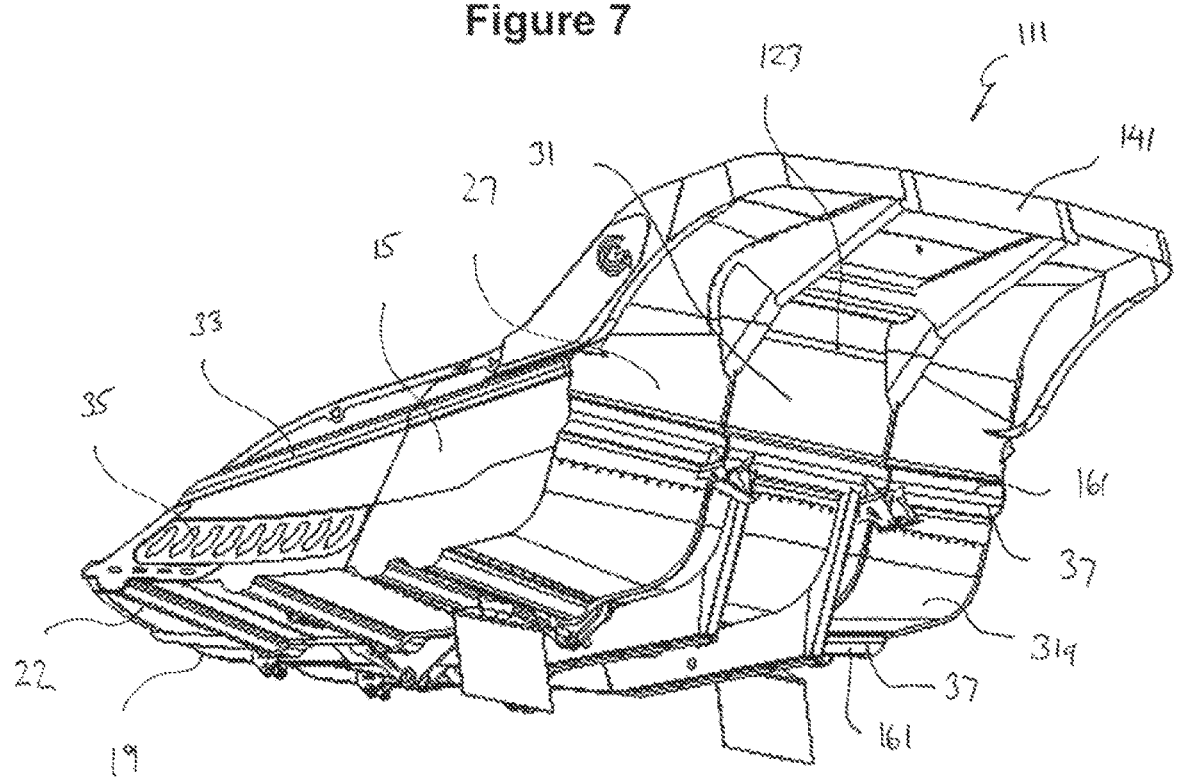
FIG. 8 is a bottom perspective view of the tray shown in FIG. 7.

The tray 11 incorporates a number of ribs 37 in the form of beams, which are secured to the contoured panel 22. As shown in FIG. 3 the floor section 25 has three ribs 37 secured thereto while the front wall section 27 has one rib secured thereto. As would be understood by a person skilled in the art more or less ribs 37 can be secured thereto while still remaining in the scope of this invention.

Each rib 37 has an edge which is secured to the relevant floor section 25 or the front wall section 27 by intermittent welds extending therealong. Each rib 37 also incorporates a stress relief means in the form of a plurality of cut-outs 39. The cut-outs 39, along with the intermittent welds provide the tray with a higher degree of flexibility compared to current trays 11.

The cross-sectional profile of the floor section 25 is curved. This is achieved by welding adjacent curved plates at an angle relative thereto. In this regard the plates take the form of a portion of a side of a cone or of a bicone depending on their position relative to the longitudinal axis of the tray 11.

Each side wall 15 has a side rib 33 formed therein during manufacture. By having the side rib 33 integral with the side wall 15, the two side walls 15 can be spaced further apart allowing the tray to carry a greater volume of payload.

Each side wall 15 also incorporates a stiffening plate 35 to add further rigidity to the tray 11.

The tray 11 provides a canopy 41 extending from the top end 23 of the tray's front panel.

The tray 41 is contoured such that, provided the gross vehicle weight limits are not exceeded, the payload, regardless of its volume, will distribute the weight of the payload such that the axle load varies no more than 3% from the optimum axle load distribution upon which the tray was designed.

Referring to FIGS. 7 to 20, the invention according to a second embodiment comprises a body which is in the form of a tray 111 suited for a dump/tip truck (not shown) used for mining. For convenience features of the tray 111 that are similar or correspond to features of the tray 11 of the first embodiment have been referenced with the same reference numerals.

Similar to the tray 11 of the first embodiment, the tray 111 of the second embodiment comprises two side surfaces 13 each provided by a sidewall 15. The sidewalls 15 are in spaced apart relation whereby the tray tapers outwardly from a front 17 of the tray to a rear end 19 of the tray 111. Spanning between the two sidewalls 15 is a longitudinal surface 21 in the form of a contoured panel 22. The contoured panel 22 and the sidewalls 15 define a cavity 30 for receiving a payload, such as ore (not shown). The contoured panel 22 extends from the rear end 19 to a top end 23 of the tray 111. The contoured panel 22 provides a floor section 25 and a front wall section 27.

Figure 9:
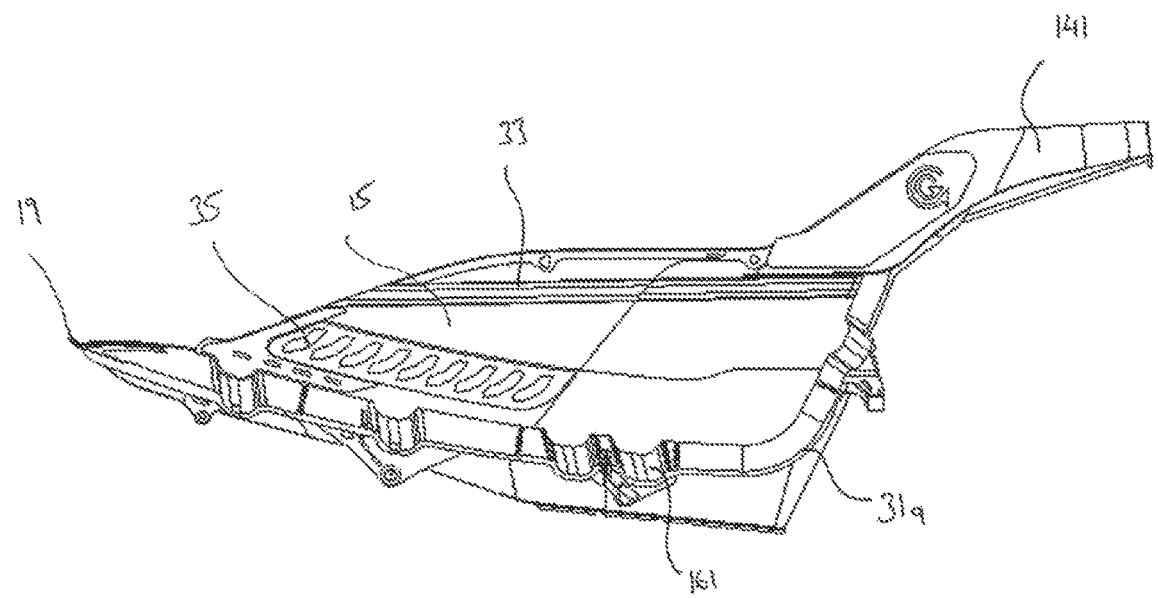
FIG. 9 is a side view of the tray shown in FIG. 7.
Figure 10:
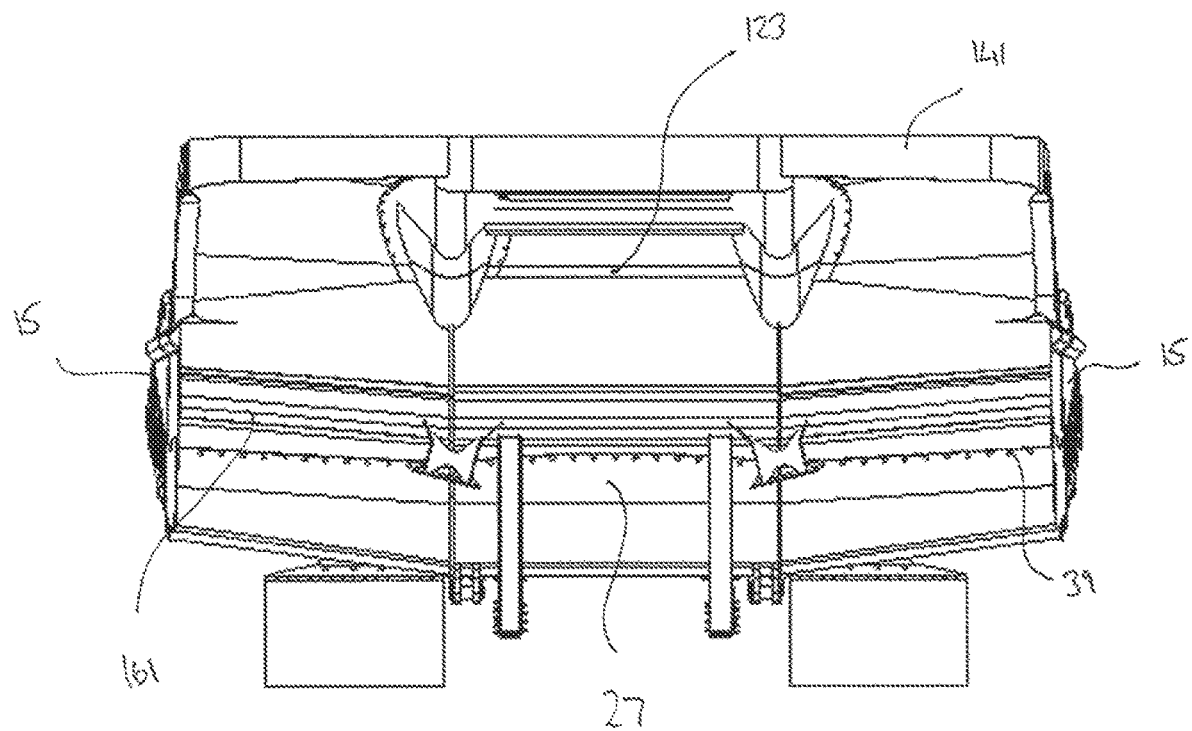
FIG. 10 is a front view of the tray shown in FIG. 7.
Figure 11:
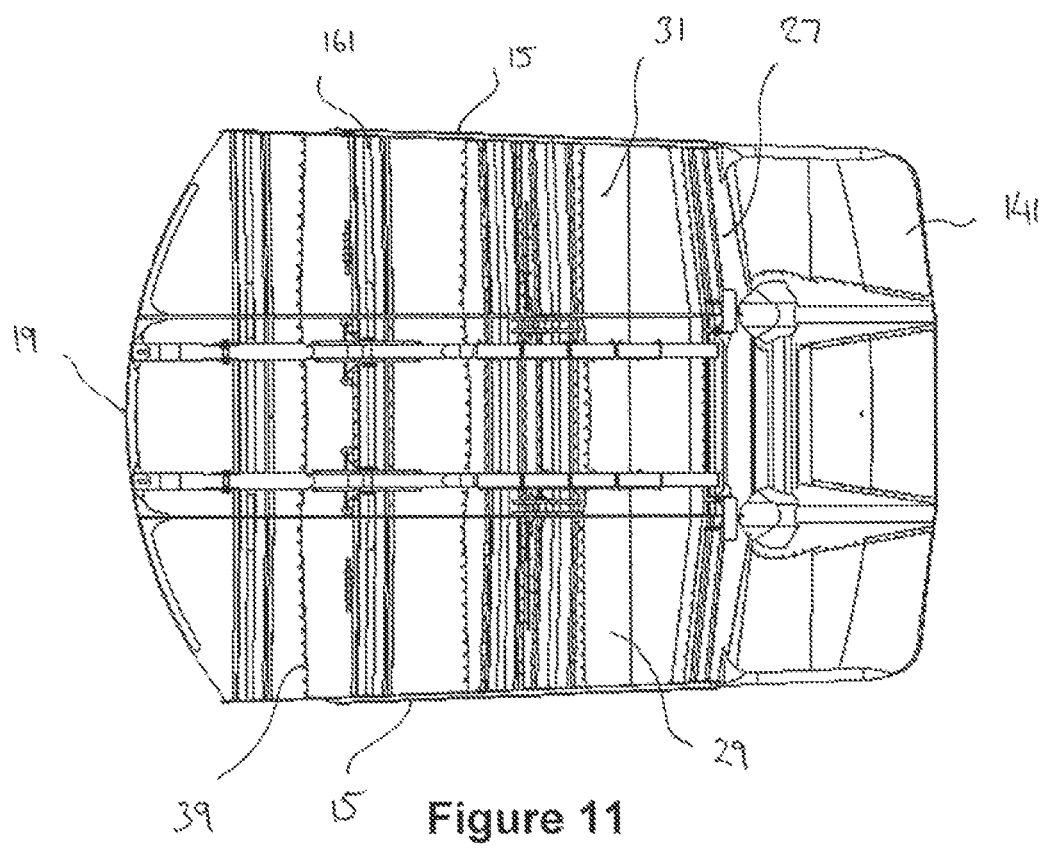
FIG. 11 is a bottom view of the tray shown in FIG. 7.
Figure 12:
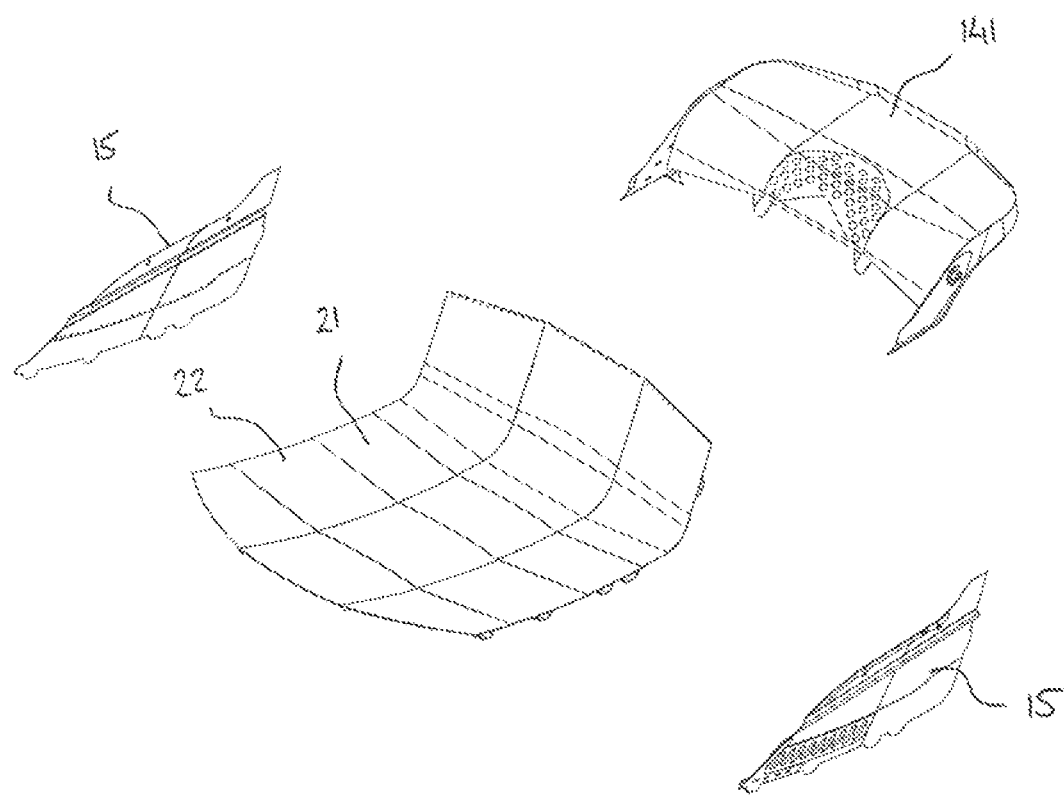
FIG. 12 is an exploded top perspective view of, the tray shown in FIG. 7.
Figure 13:
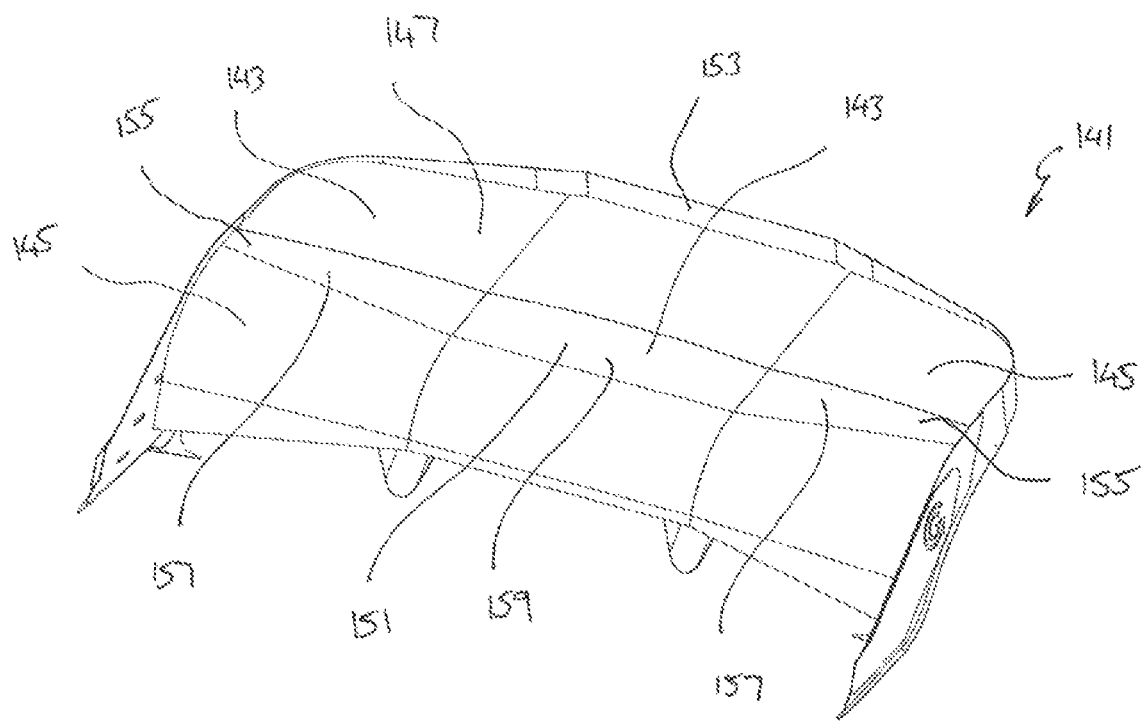
FIG. 13 is a top perspective view of a canopy as shown in FIG. 7.
Figure 14:
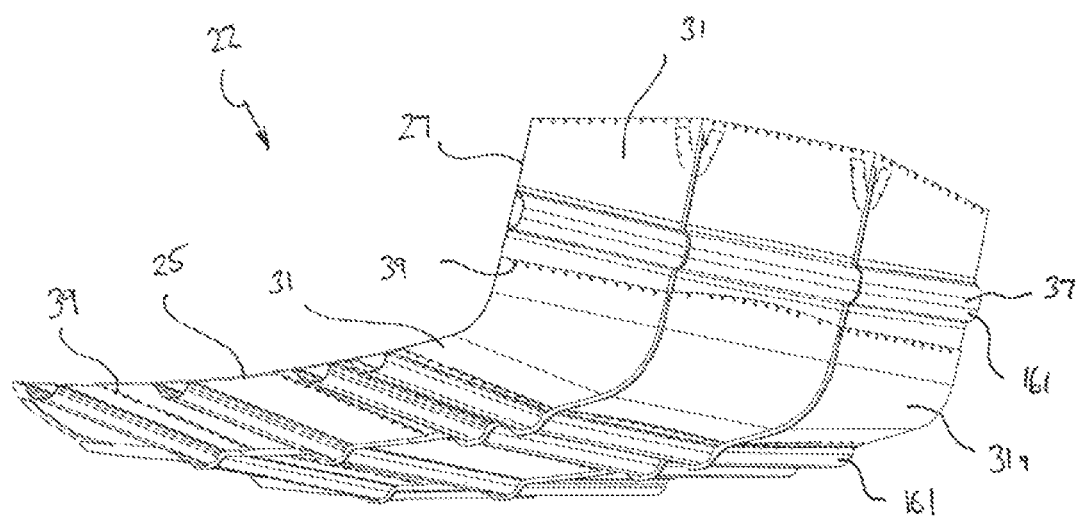
FIG. 14 is a bottom perspective view of a longitudinal surface of the tray shown in FIG. 7, the longitudinal surface provided by a contoured panel comprising a floor section and a front wall section.
Figure 15:
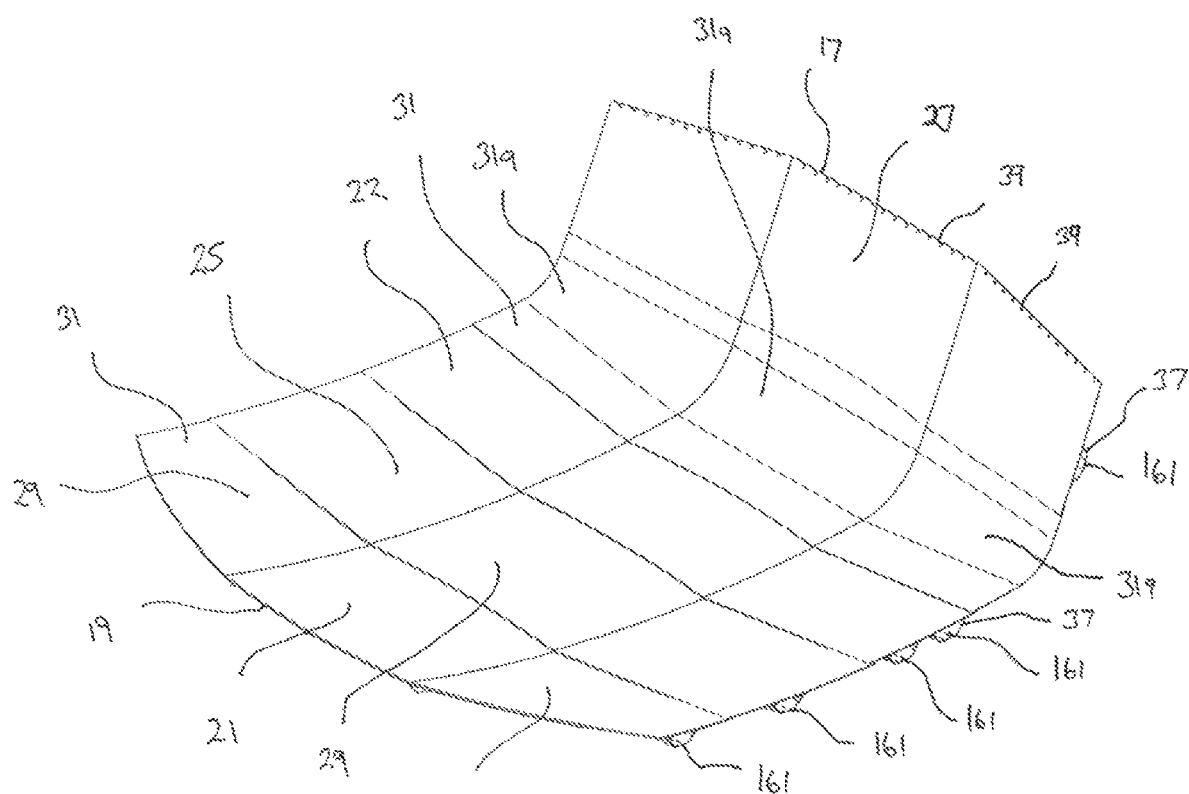
FIG. 15 is a top perspective view of the longitudinal surface, comprising the floor section and the front wall section as shown in FIG. 14.

The tray 111 of the second embodiment also comprises a canopy 141 which is angled relative to the front wall section 27 as best represented in FIG. 9.

The canopy 141 is secured to a front edge/top end 123 of the contoured panel 22 and is orientated such that any stray payload impacting upon the canopy during a loading event is directed towards the cavity 30 of the tray 111. In this regard the canopy 141 funnels stray payload into the cavity 30.

The canopy 141 incorporates several curved sections 143 formed from a plurality of curved plates 145 and transitions from the front wall section 27 with curves which are reversed to the curve of the transition from the front wall section 27 to the floor section 25.

The canopy surface 147 is angled rearwardly toward a central area of the tray 111 whereby a central portion 151 of the canopy 141 is lower than a front edge 153 of the canopy.

The sides 155 of the canopy provide a surface 157 which is sloped downwardly toward the central portion 151 of the canopy 141 such that the central portion 151 of the canopy is lower than the sides 155 of the canopy. This arrangement eliminates the historically used squared joint between the canopy and the front wall section.

Figure 16:
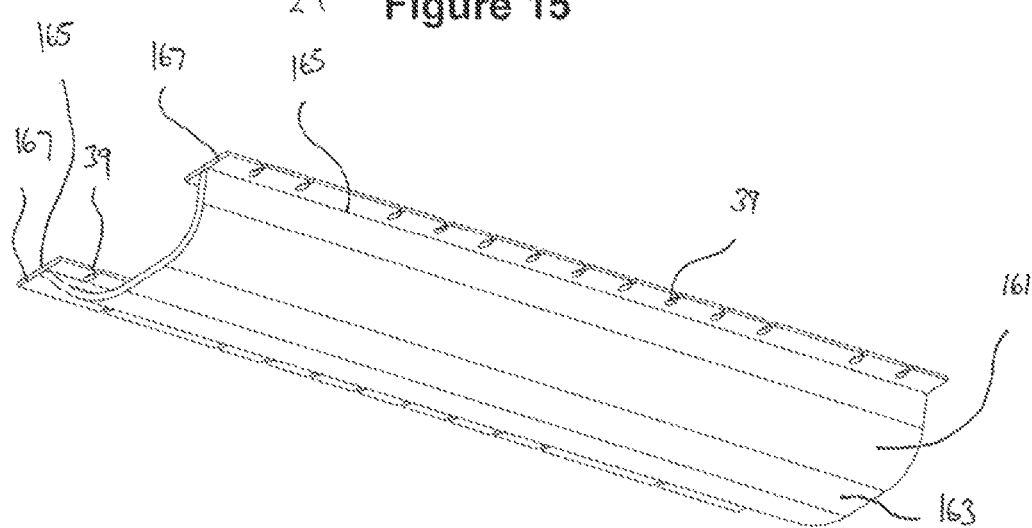
FIG. 16 is a perspective view of a C-beam as shown in FIG. 14.
Figure 17:
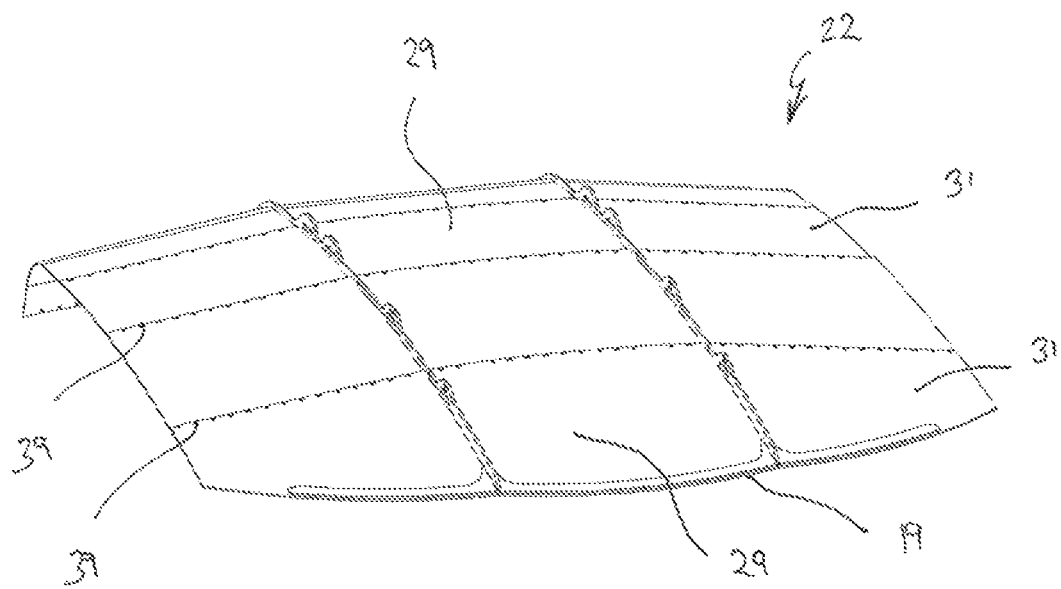
FIG. 17 is a bottom perspective view of a portion of the contour panel as shown in FIG. 15.
Figure 18:
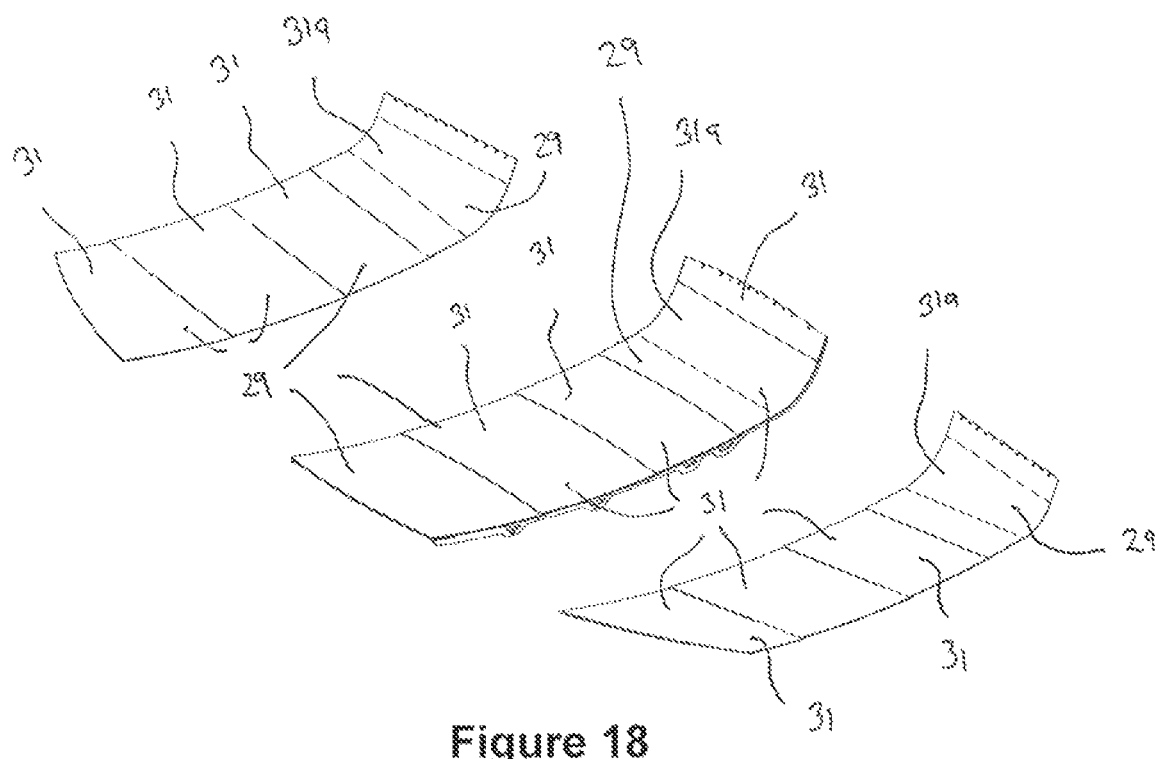
FIG. 18 is a partially exploded view of the portion of the contour panel as shown in FIG. 15.
Figure 19:
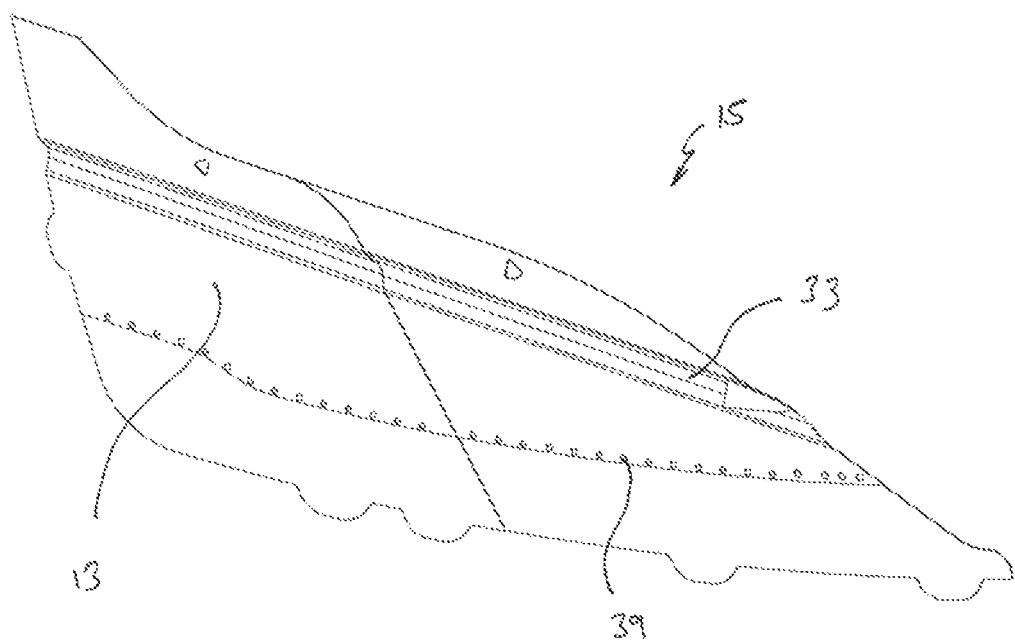
FIG. 19 is an inner side view of a side wall of the body shown in FIG. 7.
Figure 20:
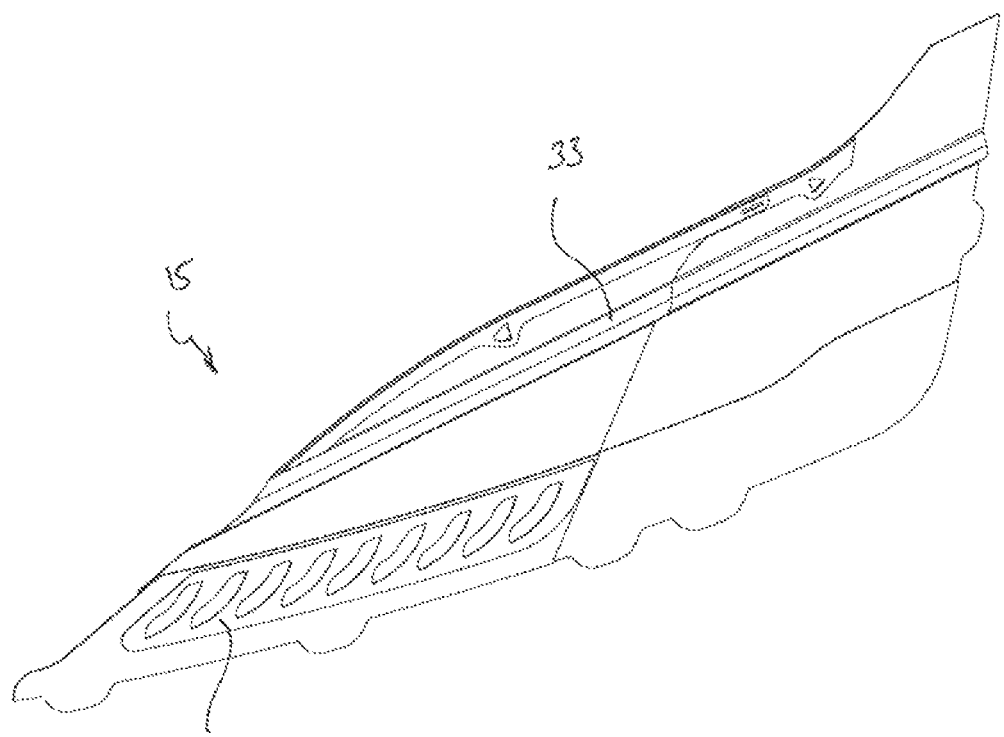
FIG. 20 is an outer side view of the side wall of the body shown in FIG. 7.

A further difference between the tray 111 of the second embodiment and the tray 11 of the first embodiment is the configuration of the ribs. Referring to FIG. 16 the ribs 137 of the second embodiment are in the form of a C-beam 161 having a flattened portion 163 between its curved sections to stiffen the C-beam 161.

As noted in FIG. 16, each flat plate 167 has a plurality of cut-out sections 39 which provide a stress relief means. During assembly each elongate flat plate 167 is intermittently welded to the underside of the contoured panel 22, whereby the welds extend between cut-out sections. Once the flat plates 167 are secured each edge 165 of the C-beam 161 is welded to the elongate flat plate 167 with a continuous weld. This arrangement eliminates the high stress experienced at the joint when the body is twisting and flexing as otherwise experienced by a continuous weld and provides a more robust, yet flexible means to add strength to the tray 111 while minimising weight.

Securing the C-beam in this manner isolates the beam from direct contact to the longitudinal surface, and allows the flat plates to accommodate and distribute the flex in the body.

In one embodiment the floor section, as defined by a best fit plane perpendicular to the longitudinal axis of the tray 111 may be at an angle of between 100° to 140° to the front wall section as defined by a best fit plane perpendicular to the longitudinal axis of the tray 111. In another embodiment the angle may be between 110° to 130°.

In one embodiment the canopy, as defined by a best fit plane perpendicular to the longitudinal axis of the tray 111 may be at an angle between 30° to 80° to the front wall section as defined by a best fit plane perpendicular to the longitudinal axis of the tray 111. In another embodiment the angle may be between 40° to 70°.

With the present invention as applied to a truck having six tyres across two axles, regardless of the volume of the material being carried, and as long as the weight of that material does not cause the GVW to be exceeded, the weight distribution will always be 33% front axle 67% rear axle, which is the optimum distribution. This is not the case for all prior art bodies/trays. For these bodies the smaller the volume with the heavier material, the further forward the weight distribution shifts. This overloads the two front tyres, even though the truck is not overloaded.

In the present invention when the body is filled such that the weight of payload exceeds the GVW, the centre of gravity of the payload is caused to move to the rear, changing the weight distribution on the axles by putting the overload on the rear four tyres instead of the two front tyres. This is not the case for all other bodies on the market in which any truck carrying overload results in a large portion of that overload being transferred to the front axle. This benefit is achieved by contouring the body to ensure the centre of gravity of any load under the GVW limit is positioned to ensure that the optimum axle load distribution is achieved.

For example, a body according to the present invention which is fitted to a truck rated at a 250 tonne payload and loaded to GVW, is configured so as to distribute the load 33% to the front axle and 67% to the rear axle If this same truck was overloaded by 10%, providing a payload of 275 tonne, the body will cause the overload to be distributed rearwardly such that the load is distributed 32% to the front axle and 68% to the rear axle.

If this same truck was overloaded by 20%, providing a payload of 300 tonne, the body will cause the overload to be distributed rearwardly such that the load is distributed 30% to the front axle and 70% to the rear axle.

With the present invention, any overload beyond the GVW will cause the extra load to move to the rear four tyres.

The present invention provides a body which is capable of being used on any size or model truck from 25 to 400+ tonne (metric) payload capacity and any different brand of truck manufacturer.

Another way the present invention seeks to improve the design of the truck's tray is by reducing its structural weight. One way it achieves this is by using hard steel plates capable of being used as structural member. This eliminates the need to add wear liners or impact plate protection, allowing the truck to carry more payload while remaining still within the GVW limits. Another way is to contour the tray so that the The present invention provides production advantages and reduces the cost to move the earthen material. It also addresses some of the ongoing maintenance and operational issues which exist in present day designs. The present invention seeks to:
a. increase payload carried;
b. reduce truck cycle time;
c. improve dumping;
d. reduce waste dump bulldozer work;
e. reduce tyre operating cost per tonne basis;
f. reduce fuel consumption on per tonne basis;
g. reduce maintenance on per tonne basis;
h. improve truck availability relating to body downtime;
i. provide a short capital invested payback period;
j. increase wear life without installation of wear liners.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

While the invention has been shown and described with reference to certain exemplary embodiments thereof, it will be understood by those skilled in the art that various changes in form and details may be made therein without departing from the spirit and scope of the invention as defined by the appended claims.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Such variations are not to be regarded as a departure from the disclosure, and all such modifications are intended to be included within the scope of the disclosure.

The invention claimed is:

1. A body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;
   two side surfaces interconnected by a longitudinal surface keeping the side surfaces in spaced apart relation;
   the longitudinal surface and the side surface defining a cavity for receiving a payload;
   wherein the longitudinal surface is configured such that the payload is self-centering as the body is loaded, such that in operation the load distribution on the front axle and the load distribution on the rear axle remain substantially the same between a first payload having a first volume and a second payload having a second volume, neither payload resulting in the gross vehicle weight limit being exceeded.

2. The body according to claim 1 wherein the variation in the axle load distribution between the first payload and the second payload is less than 5.0%.

3. The body according to claim 1 wherein the second payload has a different density to the first payload such that the first volume and second volume vary, wherein the longitudinal surface is configured such that there is minimal variation between the position of the centre of gravity of the first payload along the longitudinal axis of the body and the position of the centre of gravity of the second payload.

4. The body according claim 1 wherein the longitudinal surface incorporates one or more curved sections.

5. The body according to claim 4 wherein the longitudinal surface is in the form of a contoured panel formed from a plurality of plates.

6. The body according to claim 5 wherein one or more of the plurality of plates is curved and co-operate with adjacent plates to provide the curved sections.

7. The body according to claim 6 wherein the one or more of the purity of plates are curved such that they are in the form of a portion of a side of a cone.

8. The body according to claim 1 wherein the longitudinal surface provides a floor section and a front wall section, wherein a transition from the floor section to the front wall section is through a one to three metre radius.

9. The body according to claim 8 wherein the front wall section is divided into three sections across the width of the body: a right section, a middle section and a left section, whereby the left and right sections are angled rearward in order to shape the front wall section to cause earthen material placed in the body to be positioned away from the front axle, wherein the transition of the left and right sections of the front wall section with the respective left side and right side of the bottom section form a conical shape which eliminates corners and assists in controlling centering of the earthen material during load placement.

10. The body according to claim 5 wherein the plates are arranged such that adjacent plates in the longitudinal direction overlap with each other in a manner which does not inhibit the flow of earthen material during unloading.

11. The body according to claim 5 wherein the plates are welded together wherein the welds comprise a continuous lap weld on the exposed surface at the rear end of each plate, and an interrupted lap weld on the underside at the front end of each plate, wherein the interrupted lap weld joint incorporates a cut-out section between each weld.

12. The body according to claim 5 wherein the plates or a section of plates are secured to each other by welding and/or bolting.

13. The body according to claim 1 wherein each side surface is provided by a side wall formed from one or more plates, wherein the one or more plates have overlapping joints to assist in strengthening the side wall, wherein each side wall provides a side rib extending therealong, the side rib extends outwardly relative to the body cavity, the side rib being integral with the side wall, wherein the transition between the side wall to the floor section is provided by a curved section.

14. The body according to any claim 8 incorporating one or more ribs which are secured to the contoured panel, wherein the one or more ribs are welded to the contoured panel on a surface which is outward from the body cavity, wherein the one or more ribs is welded intermittently along its length and incorporate stress relief means, wherein the stress relief means is in the form of a plurality of cut out sections along the rib, each cut out having an opening along that edge of the rib which is to be welded to the contoured panel, the intermittent welding being such that the weld is only discontinued at the point of the opening of each cut out, wherein the narrowest dimension of the cut out section is across the opening thereof.

15. The body according to claim 14 wherein the one or more ribs is in the form of a beam, each beam is in the form of a pressed C-beam wherein the C-beam incorporates a flattened portion between its curved sections to stiffen the C-beam profile, wherein each edge of each C-beam is secured to an elongated flat plate, wherein the C-beam is welded to each elongated flat plate along both sides of where the edge of the C-beam engages the flat plate, wherein one or both edges of each flat plate comprises a plurality of cut-out sections which are circular in shape, the flat plates being welded to the contoured panel along each edge between the cut-out sections before each longitudinal edge of the beam is secured to a respective elongate flat plate.

16. The body according to claim 1 wherein the side surfaces flare outwardly from the front section of the body to the rear of the body such that the body tapers outwardly from the front of the body to a rear end.

17. The body according to claim 1 comprising a canopy to protect the cabin during loading of the body, the canopy being formed from a plurality of plates, one or more of which are curved.

18. The body according to claim 17 wherein a surface of the canopy is angled rearwardly toward a central area of the body such that a central portion of the canopy is lower than a front edge of the canopy.

19. The body according to claim 18 wherein the sides of the canopy are angled downwardly toward the centre of the canopy such that the central portion of the canopy is lower than the sides of the canopy.

20. A vehicle having a body fitted thereto, the body being capable of tipping relative to the vehicle, the vehicle having a front axle supporting two tyres, and a rear axle supporting four tyres wherein the optimum load distribution is 33% on the front axle and 67% on the rear axle, the body comprising;
two side surfaces interconnected by a longitudinal surface keeping the side surfaces in spaced apart relation;
the longitudinal surface and the side surface defining a cavity for receiving a payload, such as ore;
wherein the longitudinal surface is configured such that the payload is self-centering as the body is loaded, such that in use, once the body is loaded within the gross vehicle weight limit, the load exerted on each axle does not exceed a 5% difference between the actual axle load distribution and the optimum axle load distribution on each axle.

21. A body adapted to be fitted to a truck such that once fitted the body is capable of tipping, the truck comprising at least two axles, the body comprising;
two side surfaces interconnected by a longitudinal surface keeping the side surfaces in spaced apart relation, the side surfaces flare outwardly from a front section of the body to the rear of the body such that the body tapers outwardly from the front section of the body to a rear end;
the longitudinal surface and the side surface defining a cavity for receiving a payload, the longitudinal surface is in the form of a contoured panel formed from a plurality of plates such that a floor section of the longitudinal surface provides a dish shaped surface;
wherein the longitudinal surface is configured such that the payload is self-centering as the body is loaded, such that in operation the variation in distribution of load on each axle is less than 5% to that originally designed regardless of the volume of payload received in the cavity provided that the gross vehicle weight limit is not exceeded.

22. A body for a truck, the body being capable of tipping, the body comprising;
two side surfaces interconnected by a longitudinal surface keeping the side surfaces in spaced apart relation;
the longitudinal surface and the side surface defining a cavity for receiving a payload, such as ore;
a canopy incorporating one or more curved sections secured to a front edge of the longitudinal surface, the canopy is configured, and angled rearwardly toward a central area of the body such that a central portion of the canopy is lower than a front edge of the canopy, whereupon any stray payload impacting upon the canopy is directed towards the cavity of the body.

23. The body according to claim 22 wherein the longitudinal surface provides a floor section and a front wall section, the canopy being secured to an edge of the front wall section remote from the floor section, wherein the canopy transitions into the front wall section with curves which are reversed to the curve of the front wall section transition into the floor.

24. The body according to claim 22 wherein the sides of the canopy provide a surface which is sloped downwardly toward the centre of the canopy such that the central portion of the canopy is lower than the sides of the canopy.

25. The body according to claim 22 wherein the canopy is formed from a plurality of plates wherein one or more of the plates are curved such that each of the one or more plates takes the form of a portion of a side of a cone.

26. A body adapted to be fitted to a truck such that once fitted the body is capable of tipping, the truck comprising a front axle supporting two tyres, and a rear axle supporting four tyres wherein the optimum load distribution is 33% on the front axle and 67% on the rear axle, the body comprising;
two side surfaces interconnected by a longitudinal surface keeping the side surfaces in spaced apart relation, the side surfaces flare outwardly from the front of the body to the rear of the body such that the body tapers outwardly from the front of the body to the rear, wherein the transition between each sidewall to the longitudinal surface is provided by a curved section;
the longitudinal surface and the side surface defining a cavity for receiving a payload;
a canopy incorporating one or more curved sections secured to a front edge of the longitudinal surface, the canopy is configured, and angled rearwardly toward a central area of the body such that a central portion of the canopy is lower than a front edge of the canopy, whereupon any stray payload impacting upon the canopy is directed towards the cavity of the body;
wherein the longitudinal surface is configured such that once the body is loaded within the gross vehicle weight limit, the load exerted on each axle does not exceed a 5% difference between the actual axle load distribution and the optimum axle load distribution on each axle.

* * * * *

UNITED STATES PATENT AND TRADEMARK OFFICE
CERTIFICATE OF CORRECTION

| | |
|---|---|
| PATENT NO. | : 11,440,454 B2 |
| APPLICATION NO. | : 17/048756 |
| DATED | : September 13, 2022 |
| INVENTOR(S) | : John De Jager et al. |

It is certified that error appears in the above-identified patent and that said Letters Patent is hereby corrected as shown below:

On the Title Page

Item [73], "Assignee: G&G Mining Fabrication Pty Ltd" should be
--SSAB Technology AB--

Signed and Sealed this
Eleventh Day of October, 2022

Katherine Kelly Vidal
*Director of the United States Patent and Trademark Office*